US006976630B2

(12) United States Patent
Miyazawa et al.

(10) Patent No.: US 6,976,630 B2
(45) Date of Patent: Dec. 20, 2005

(54) BAR-CODE READER, METHOD OF READING A BAR CODE, AND COMPUTER PRODUCT

(75) Inventors: Hideo Miyazawa, Inagi (JP); Isao Iwaguchi, Inagi (JP); Mitsuo Watanabe, Inagi (JP); Kozo Yamazaki, Iangi (JP); Masanori Ohkawa, Iangi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 10/761,371

(22) Filed: Jan. 22, 2004

(65) Prior Publication Data

US 2004/0164160 A1 Aug. 26, 2004

(30) Foreign Application Priority Data

Feb. 21, 2003 (JP) .............................. 2003-044987

(51) Int. Cl.[7] .................. G02B 26/10; G06K 19/06; G06K 7/10; G06K 9/22
(52) U.S. Cl. ...................... 235/462.25; 235/462.16; 235/462.01; 382/181
(58) Field of Search ................ 235/462.16, 462.01, 235/462.08, 462.18–462.19, 462.25; 382/181, 382/183

(56) References Cited

U.S. PATENT DOCUMENTS

| | | | |
|---|---|---|---|
| 5,442,164 A | | 8/1995 | Adachi |
| 5,675,136 A | | 10/1997 | Keinath et al. |
| 5,767,497 A | * | 6/1998 | Lei ........................ 235/462.12 |
| 5,801,369 A | * | 9/1998 | Akeda ................... 235/462.16 |
| 5,969,325 A | * | 10/1999 | Hecht et al. ........... 235/462.16 |
| 5,979,765 A | * | 11/1999 | Watanabe et al. ...... 235/462.25 |
| 6,050,489 A | * | 4/2000 | Goto et al. ............ 235/462.16 |
| 6,126,075 A | * | 10/2000 | Agabra et al. .............. 235/454 |
| 6,209,788 B1 | | 4/2001 | Bridgelall et al. |
| 6,328,213 B1 | * | 12/2001 | He et al. ................ 235/462.25 |
| 6,334,572 B1 | * | 1/2002 | Iwaguchi et al. ...... 235/462.27 |
| 6,386,454 B2 | * | 5/2002 | Hecht et al. ........... 235/462.16 |
| 6,478,223 B1 | * | 11/2002 | Ackley ................... 235/462.04 |
| 6,478,224 B1 | * | 11/2002 | Gettys ................... 235/462.19 |
| 6,494,376 B1 | * | 12/2002 | Davis et al. ........... 235/462.16 |
| 6,499,662 B1 | * | 12/2002 | Coleman et al. ...... 235/462.18 |
| 2001/0035458 A1 | * | 11/2001 | Schum et al. .......... 235/462.08 |
| 2002/0021835 A1 | * | 2/2002 | Andreasson et al. ........ 382/170 |
| 2002/0162890 A1 | * | 11/2002 | Tsi et al. ............... 235/462.16 |
| 2004/0129784 A1 | * | 7/2004 | Iwaguchi et al. ...... 235/462.16 |
| 2004/0164158 A1 | * | 8/2004 | Miyazawa et al. ..... 235/462.16 |

FOREIGN PATENT DOCUMENTS

| | | |
|---|---|---|
| EP | 0 427 528 A | 5/1991 |
| EP | 1 205 873 A | 5/2002 |
| JP | 7-234913 | 9/1995 |

* cited by examiner

Primary Examiner—Karl D. Frech
Assistant Examiner—Daniel Walsh
(74) Attorney, Agent, or Firm—Armstrong, Kratz, Quintos, Hanson & Brooks, LLP (57) ABSTRACT

In an optical scanner, an optical scanner optically scans a bar code to obtain signal strength of light reflected from black bars and white bars of the bar code, an extracting unit extracts edge data, which includes a plurality of edges and the signal strength of which changes corresponding to a change from a black bar to a white bar and vice versa, an edge-emphasizing unit that emphasizes edge data of an edge that satisfies a predetermined condition, a ternary judgment unit that makes a ternary judgment of each edge based on the edge emphasized to obtain a ternarizing result, and a decoder that decodes bar-code characters from the ternarizing result.

3 Claims, 6 Drawing Sheets

FIG.2A
EXTRACTOR OUTPUT

FIG.2B
NARROW-BAND DIFFERENTIAL PROCESSOR OUTPUT

FIG.2C
MODULE-POINT EXTRACTOR OUTPUT

FIG.2D
EDGE-EMPHASIZING PROCESSOR OUTPUT

| TAP | COEFFICIENT |
|-----|-------------|
| C1  | 0           |
| C2  | -0.5        |
| C3  | 1           |
| C4  | -0.5        |
| C5  | 0           |

BAR-CODE READER, METHOD OF READING A BAR CODE, AND COMPUTER PRODUCT

BACKGROUND OF THE INVENTION

1) Field of the Invention

The present invention relates to a bar-code reader, a method of reading a bar code, and a computer program for reading a bar code efficiently and accurately.

2) Description of the Related Art

The bar-code system is well known in the field of products distribution. In this system, a product is provided with a bar code in advance and when the product is held up to a bar-code reader (bar-code scanner), the bar code of the product is read. By reading the bar code of a product, information of the product such as product price, product name etc. is obtained and recorded in a register.

Concretely, in the bar-code unit, the following series of processes is performed.

(1) A bar code is formed by an array of width information of black bars and white bars. A light beam is irradiated on the bar code, and light reflected from the bar code is received. An electric signal, having amplitude corresponding to an optical power of the reflected light, is generated.

(2) From the change in the amplitude of the electric signal, boundary signals (edge signals) of boundary from a white bar to a black bar and of boundary from a black bar to white bar are extracted.

(3) Distance between the edge signals extracted is measured as a bar-width counting value using a clock that has a resolution power from tens to hundreds of times of the bar width.

(4) From the bar-width counting value measured, the width of each bar that forms the bar code is measured and a ratio of widths of the white bars and black bars is calculated.

Thus, in the conventional bar-code reader, if the light reflected from the bar code has sufficient optical power and large amplitude, the ratio of widths of the white bars and the black bars can be known accurately. Consequently, the product information obtained with the help of the bar code is more accurate.

However, there are practical problems in operating a bar-code reader. For instance, if the light reflected from the bar code is insufficient, an error occurs in reading widths of bars of the bar code.

Sometimes black bars become thicker than desired, particularly, due to spreading of ink when the bar code is printed. Amplitude of reflected light declines due to the presence of a thick black bar or a thick white bar. This results in a misjudgment of a bar being a part of a white bar in spite of being a part of a black bar, and vice versa.

Figure 3:
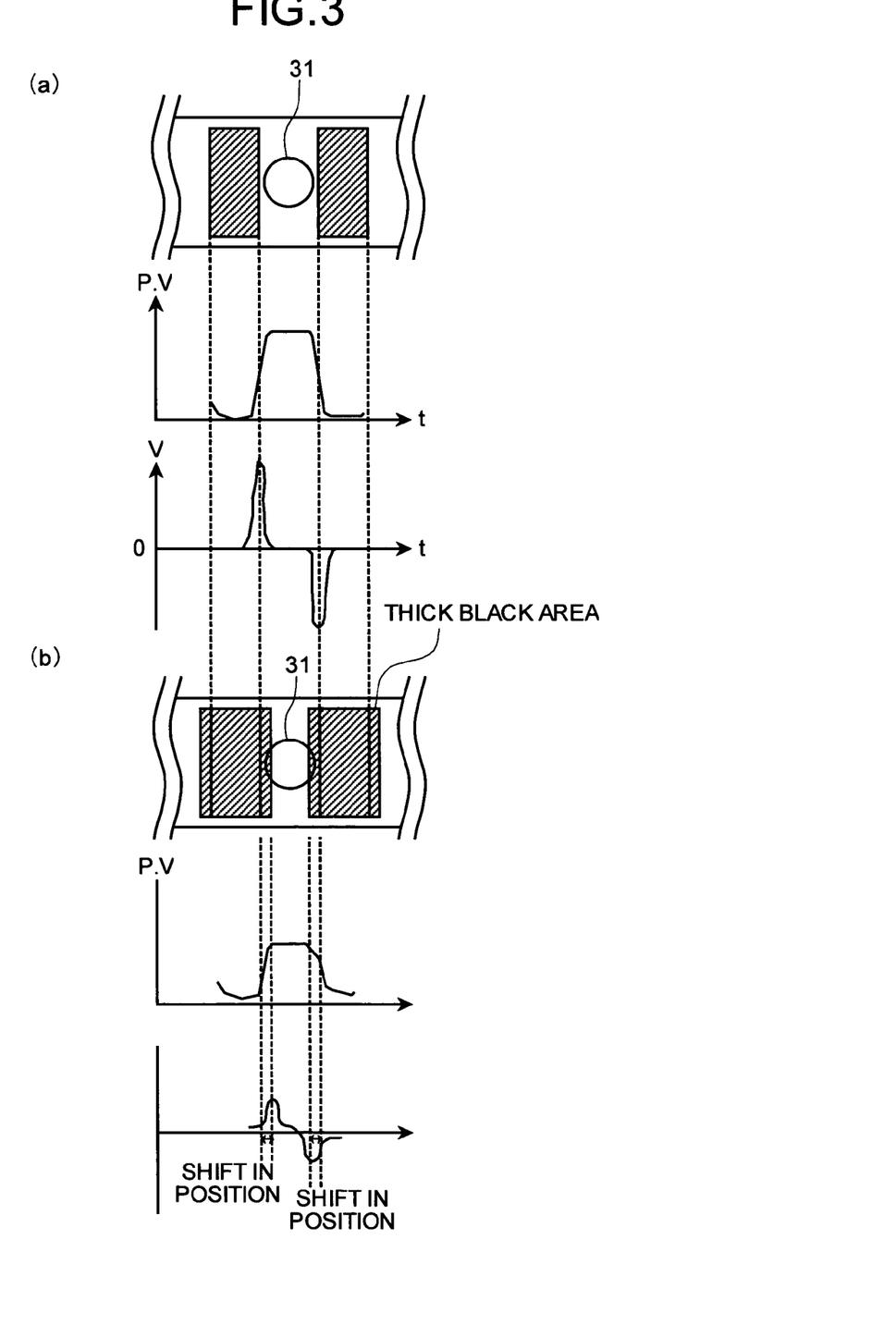
FIG. 3 is to explain a black bar that is thicker than desired.

To describe this concretely, as illustrated in FIG. 3, a diameter of a light beam 31 that is irradiated on a bar code is originally set to be smaller that a basic distance between bars (see (a) in FIG. 3). This enables to acquire substantial reflected light, thereby acquiring sufficient value of an edge signal. However, if there is a thick black bar (see (b) in FIG. 3) or a thick white bar, substantial reflected light is not acquired. Therefore, a sufficient value of the edge signal is not acquired. This results in errors in reading the white and black bars of the bar code.

Moreover, if the distance between a reading surface of a bar-code reader and a bar code is large, the scanning speed of the light beam becomes relatively faster than the speed when the distance is less and the diameter of the light beam becomes greater than the basic distance between bars. This also results in an inability to acquire substantial reflected light, thereby leading to errors in reading the white and black bars of the bar code.

Japanese Patent Application Laid-open Publication No. H7-234913 discloses a technology to compensate the change in a level of a signal received, due to thickness of a black bar or a white bar, by applying an HPF (high pass filter) to an output of light that is received by a light receiving unit and that is reflected from a bar code. However, the disclosure is related only to an absorption of the change in a level of a signal received and does not prevent decline in an accuracy of reading that is caused due to problems such as a thick black bar etc.

SUMMARY OF THE INVENTION

It is an object of the present invention to solve at least the problems in the conventional technology.

A bar-code reader according to one aspect of the present invention includes an optical scanner that optically scans a bar code to obtain signal strength of light reflected from black bars and white bars of the bar code; an extracting unit that extracts edge data, which includes a plurality of edges and the signal strength of which changes corresponding to a change from a black bar to a white bar and vice versa; an edge-emphasizing unit that emphasizes edge data of an edge that satisfies a predetermined condition; a ternary judgment unit that makes a ternary judgment of each edge based on the edge emphasized to obtain a ternarizing result; and a decoder that decodes bar-code characters from the ternarizing result.

A method of reading a bar code according to still another aspect of the present invention includes optically scanning a bar code to obtain signal strength of light reflected from black and white bars of the bar code; extracting edge data, which includes a plurality of edges and the signal strength of which changes corresponding to a change from a black bar to a white bar and vice versa; emphasizing an edge from the edge data; making a ternary judgment for each edge based on the edge emphasized to obtain a ternarizing result; and decoding bar-code characters from the ternarizing result.

A computer program according to still another aspect of the present invention makes it possible to realize the method according to the above aspect on a computer.

The other objects, features, and advantages of the present invention are specifically set forth in or will become apparent from the following detailed descriptions of the invention when read in conjunction with the accompanying drawings.

DETAILED DESCRIPTION

Exemplary embodiments of a bar-code reader, a method, and a computer program relating to reading a bar-code according to the present invention are explained in detail below with reference to the accompanying diagrams.

Figure 1:
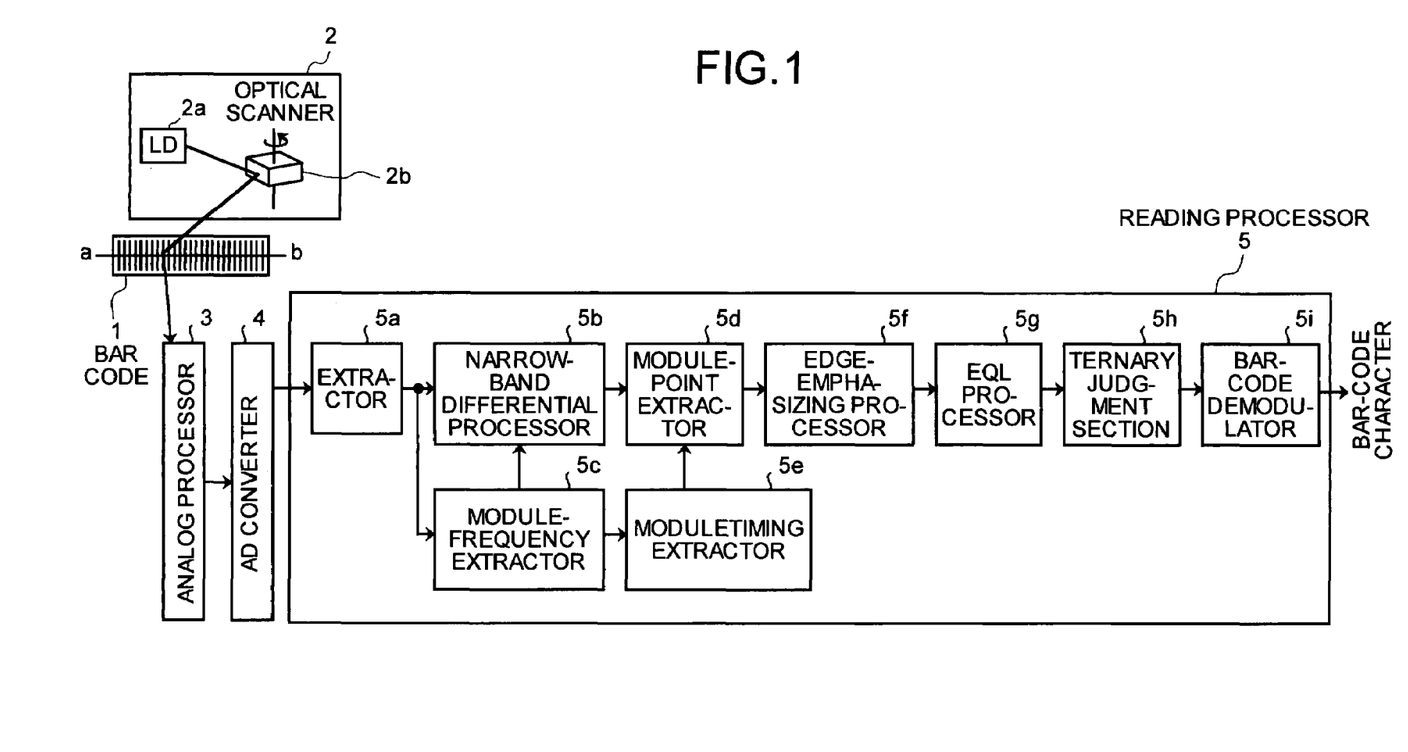
FIG. 1 is a block diagram of a bar-code reader according to an embodiment of the present invention.

FIG. 1 is a block diagram of the bar-code reader according to an embodiment of the present invention. This bar-code reader includes an optical scanner 2, an analog processor 3, an AD converter 4, and a reading processor 5.

The optical scanner 2 includes a laser diode (LD) 2a and a polygon mirror 2b. The LD 2a emits a light beam. A mirror that reflects the light beam emitted from the LD 2a forms the polygon mirror 2b. The direction of reflection of the light beam is changed by rotating the polygon mirror 2b using a motor (not shown in the diagram). Thus, the polygon mirror 2b provides a plurality of scanning patterns. Using the optical scanner 2, the light beam emitted from the LD 2a is radiated, due to the rotation of the polygon mirror 2b, on a bar code 1 that is held on a reading surface. The light beam is irradiated in a direction from a to b in the diagram.

A light receiving section of the analog processor 3 receives light reflected from the bar code 1. The analog processor 3 performs opto-electric conversion of the light received and converts it to an electric signal. The amplitude of this electric signal depends on the intensity of the light. The analog processor 3 then amplifies the signal according to the requirement. The AD converter 4 performs digital sampling of the opto-electrical signal amplified by the analog processor 3, and outputs it as a digital signal.

The reading processor 5 specifies bar-code characters based on the digital signal that is received from the AD converter 4 and outputs the signal. The reading processor 5 includes an extractor 5a, a narrow-band differential processor 5b, a module-frequency extractor 5c, a module-point extractor 5d, a module-timing extractor 5e, an edge-emphasizing processor 5f, an EQL processor 5g, a ternary judgment section 5h, and a bar-code demodulator 5i.

Figure 2A:
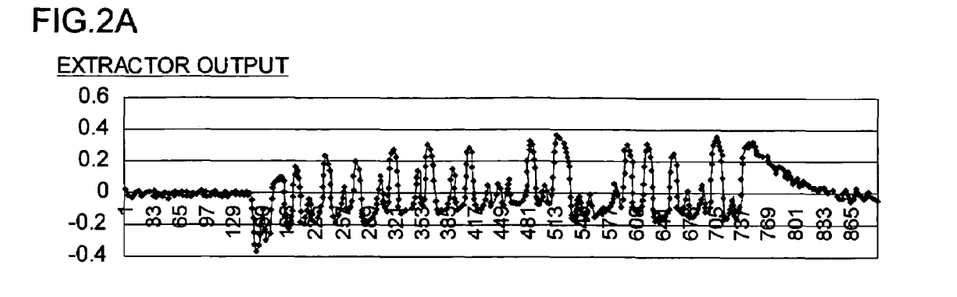
FIG. 2A is a waveform output from an extractor.

The extractor 5a extracts, from the opto-electrical signal, only a signal that is apparently a bar code signal, to reduce the load of processing in the latter part. Concretely, the opto-electrical signal is in the form of a wave with time on the vertical axis and amplitude on the horizontal axis. Therefore, the extractor 5a extracts a part of the waveform as illustrated in FIG. 2A.

Figure 2B:
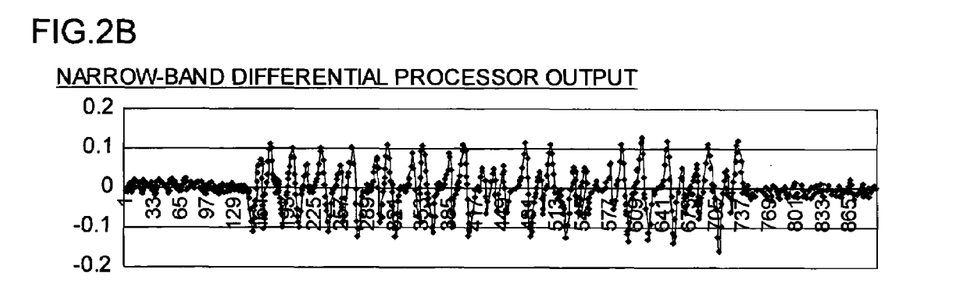
FIG. 2B is a waveform output from an narrow-band differential processor.

The module-frequency extractor 5c extracts a module-frequency that is equivalent to a basic module of a bar code signal. The narrow-band differential processor 5b performs the narrow-band differentiation of the opto-electrical signal based on the module-frequency. Therefore, the narrow-band differential processor 5b extracts a waveform of an edge as illustrated in FIG. 2B. Concretely, when a black bar in the bar code 1 is followed by a white bar, a plus (positive) edge is developed and when a white bar in the bar code 1 is followed by a black bar, a minus (negative) edge is developed.

Figure 2C:
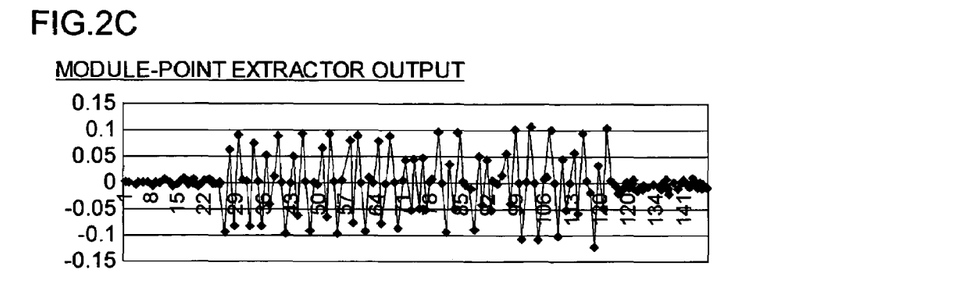
FIG. 2C is a waveform output from a module-point extractor.

The module-timing extractor 5e extracts timing for extracting a module point, based on the module-frequency extracted by the module-frequency extractor 5c. The module-point extractor 5d extracts a module point according to the timing that is extracted by the module-timing extractor 5e as illustrated in FIG. 2C.

Figure 2D:
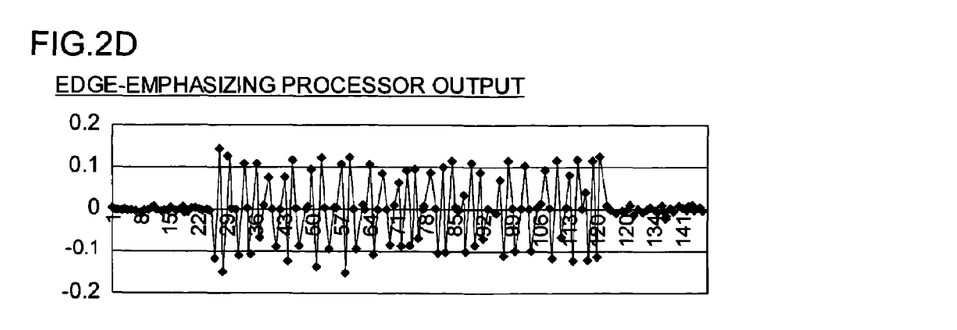
FIG. 2D is a waveform output from an edge-emphasizing processor.

The edge-emphasizing processor 5f is a processor peculiar to the present invention and emphasizes amplitude of a module point that fulfils a predetermined condition, among module points that are extracted by the module-point extractor 5d. The edge-emphasizing processor 5f outputs edge-emphasizing output as illustrated in FIG. 2D. The edge-emphasizing processor 5f emphasizes amplitude of a module point when a thick black bar or a thick white bar that forms the bar code 1 is detected.

The reason for performing the edge emphasizing is as follows. A module point has a positive amplitude that changes from a black bar to a white bar of the bar code 1 or a negative amplitude that changes from a white bar to a black bar. In spite of the module point having the positive amplitude or the negative amplitude, the amplitude of the module point decreases due to practical problems like a thick black bar developed due to spreading of ink during printing of a bar code. Edge emphasizing is performed to prevent a case that is not regarded as an edge that changes from a black bar to a white bar or an edge that changes from a white bar to a black bar.

Concretely, in a case of a thick black bar or a thick white bar of the bar code 1 a beam diameter 31 is smaller than the basic width of a black bar or a white bar (see (a) in FIG. 3). Therefore, substantial amplitude of the signal subjected to opto-electric conversion is acquired and also the amplitude of the module point increases. However, if there is a thick black bar in the bar code 1, the diameter of the beam becomes greater than the basic width of a black bar or a white bar (see (b) in FIG. 3). Therefore, substantial amplitude of the signal subjected to opto-electric conversion is not acquired and the amplitude of the module point decreases. A similar phenomenon occurs when there is a thick white bar. Therefore, when a thick black bar or a thick white bar is identified, the edge-emphasizing process is performed. In this process, the edge is shifted by the amount of excessive width of a black or a white bar. Thus, by checking the position of the edge it can be judged whether there is a thick black bar or a thick white bar.

The EQL processor 5g automatically equalizes the amplitude of a module point that has undergone edge emphasizing and a module point that has not undergone edge emphasizing. The ternary judgment section 5h makes a judgment of whether each module point is a '1' or a '0' or a '−1' using the amplitude of the module point equalized by the EQL processor 5g. A module point that has a value '1' denotes an edge that is changed from a black bar to a white bar, a module point that has a value '0' denotes an edge that is changed from a white bar to a black bar, and a module point that has a value '−1' denotes an edge without any change (in other words 'a case of no change').

The bar-code demodulator 5i specifies the combination of black bars and white bars that forms the bar code 1 and outputs bar-code characters corresponding to the specified combination.

Figure 4:
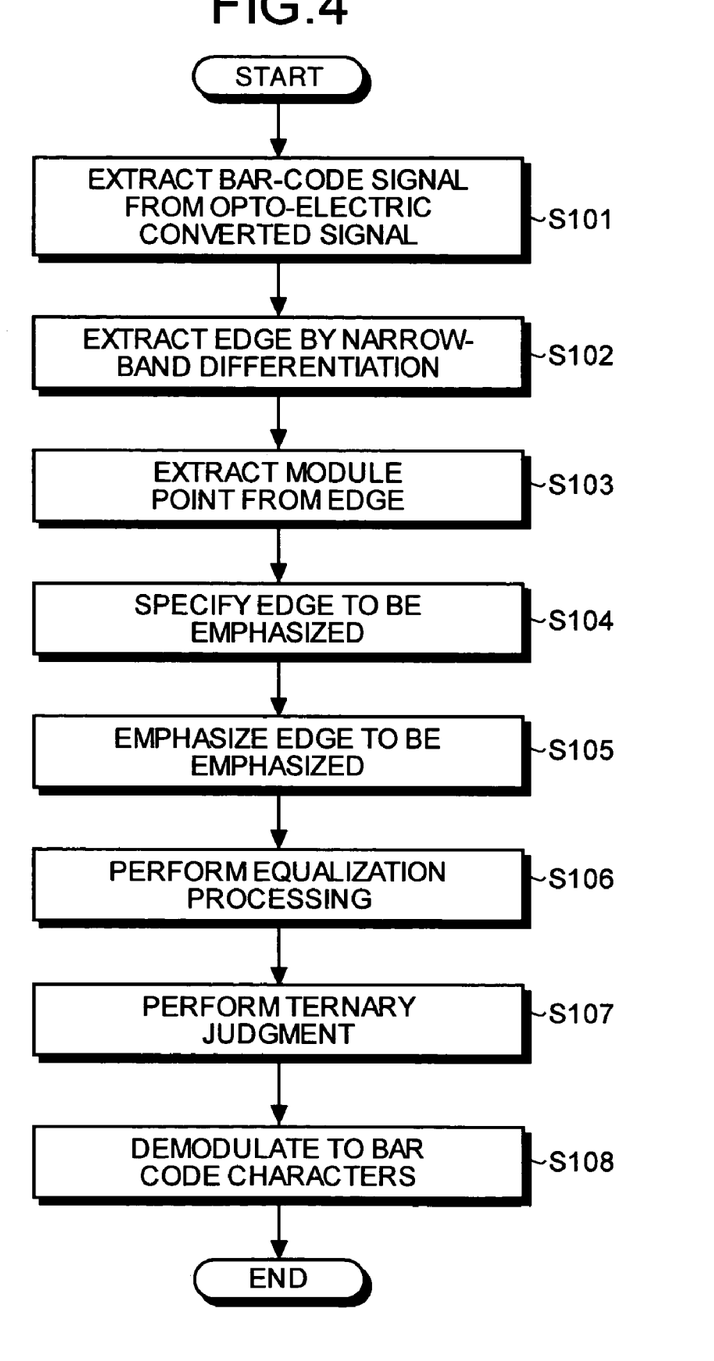
FIG. 4 is a flow chart of a process executed by a reading processor.

FIG. 4 is a flow chart of the process executed by the reading processor 5. First, the extractor 5a extracts, from the signal that is subjected to opto-electric conversion, a part that is apparently a bar-code signal (step S101).

Then, the narrow-band differential processor 5b performs narrow-band differentiation of the signal using the module frequency that is extracted by the module-frequency extractor 5c and extracts a waveform of an edge from the signal extracted by the extractor 5a (step S102). Moreover, the module-point extractor 5d extracts a module point from a waveform of an edge by using the module-timing that is extracted by the module-timing extractor 5e (step S103).

Thus, when a module point is extracted from the waveform of an edge, the edge-emphasizing processor 5f detects a thick black bar or a thick white bar, then emphasizes the edge of the corresponding part, and increases the amplitude of the module point (step S104 and S105).

Then, the EQL processor 5g performs automatic equalization (step S106). Based on the result of the automatic equalization, the ternary judgment section 5h makes a judgment of whether the module point is a '1' or a '0' or a '−1' (step S107). Using this judgment, the bar-code demodulator 5i demodulates the signal to obtain bar-code characters (step S108).

Following is a concrete description of the edge-emphasizing processor 5f with reference to FIG. 5 to FIG. 8. A transversal filter that has five delays is considered here.

Figure 5:
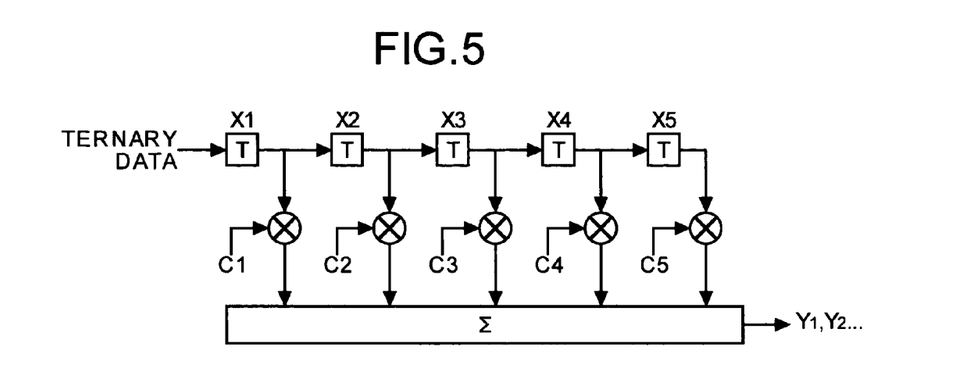
FIG. 5 is a block diagram of a transversal filter.
Figure 6:
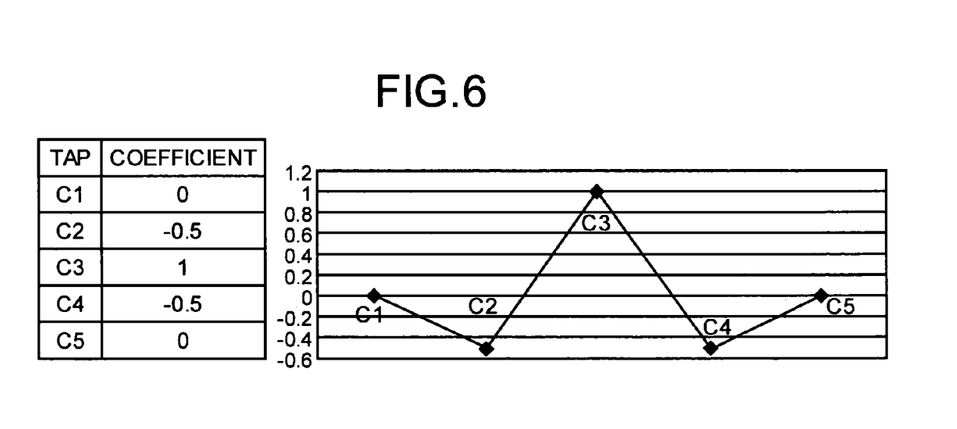
FIG. 6 is an example of tap coefficients.

FIG. 5 is a block diagram of a transversal filter. The transversal filter is a digital filter in which setting a tap coefficient can set filter characteristics. The transversal filter includes five delays (T), five multiplying units, five tap coefficients (C1 to C5), and a summing unit (Σ). By passing the amplitude of the module point of the edge waveform through the transversal filter, an output signal (Y1, Y2, ...) that depends on the value of a coefficient (shown in a formula below) can be acquired. The tap coefficients (C1 to C5) of the transversal filter are assigned while considering a relationship with the thickness. For convenience of description, as illustrated in FIG. 6, the tap coefficients C1 and C5 are assumed to be 0, the tap coefficients C2 and C4 are assumed to be −0.5, and the tap coefficient C3 is assumed to be 1.

$$Y_n = \Sigma C_i X_{n-i}$$

where Y is the output signal, C is a tap coefficient, X is a delay signal, and n and i are suffixes.

Figure 7:
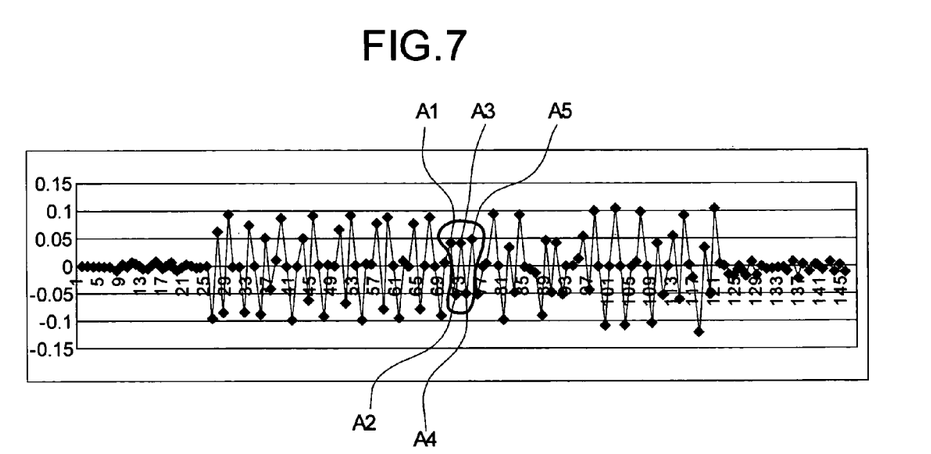
FIG. 7 is a waveform of an edge in a case of a thick black bar.

A case in which the amplitude of the module point is applied to the transversal filter is examined concretely. FIG. 7 illustrates a waveform of an edge in a case of a thick black bar. The amplitude of module points A1 to A5 is decreased as compared to the adjacent amplitudes. The decrease in the amplitude is caused by the presence of a thick black bar.

Figure 8:
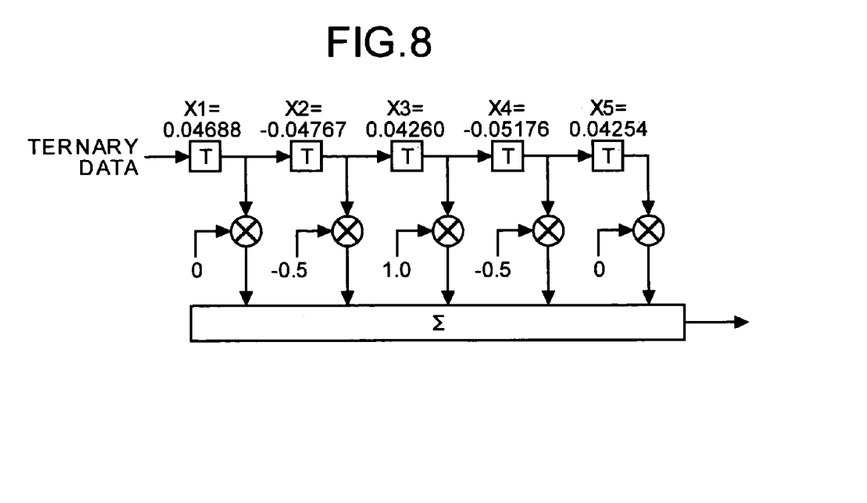
FIG. 8 is an example of calculation in the transversal filter.

If we assume that the amplitude of the module point A1 is 0.04254, the amplitude of the module point A2 is −0.05176, the amplitude of the module point A3 is 0.04260, the amplitude of the module point A4 is −0.04767, and the amplitude of the point A5 is 0.04688, these amplitude values are set in the delays X1 to X5 of the transversal filter as shown in FIG. 8.

Therefore, according to the calculation formula $$Y3 = X1 \cdot C1 + X2 \cdot C2 + X3 \cdot C3 + X4 \cdot C4 + X5 \cdot C5,$$
$$Y3 = 0.092315.$$

Since the output Y3 is an output corresponding to X3, it can be seen that the amplitude is increased as compared to the original amplitude of 0.4260.

Thus, by using the transversal filter, the edge-emphasizing can be performed to increase the amplitude of the module points having their amplitude decreased due to a thick black bar or a thick white bar. When the excessive width is less than a threshold value 1 or when the amplitude of X3 is less than a threshold value 2, the tap coefficients C1, C2, C4, and C5 are assumed to be 0 and the tap coefficient C3 is assumed to be 1. When the excessive width is more than the threshold value 1 and the amplitude of X3 is more than the predetermined threshold value 2, the tap coefficients that are shown in FIG. 6 may be used. Moreover, by changing the tap coefficients dynamically, in accordance with the thick black bar or a thick white bar, the emphasizing characteristics that emphasize the amplitude of the edge can be changed.

Thus, in this embodiment, the extractor 5a extracts, from the signal that is subjected to opto-electric conversion, a part that is apparently a bar-code signal. The narrow-band differential processor 5b performs narrow-band differentiation using the module frequency and forms the edge waveform. Further the module-point extractor 5d extracts the module point from the edge waveform. Then, the edge-emphasizing processor 5f detects a thick black bar or a thick white bar and emphasizes the edge of the corresponding part, thereby increasing the amplitude of the module point. Due to such structure, even in a case of a thick black bar or a thick white bar, the amplitude of the corresponding part can be emphasized.

In this embodiment, the edge is emphasized when there is a thick black bar or a thick white bar. However, when an edge that has amplitude greater than the predetermined threshold value is detected, the amplitude of the edge can be emphasized. In this case, in the transversal filter in FIG. 5, if the amplitude of X3 is less than the predetermined threshold value, the tap coefficients C1, C2, C4, and C5 are assumed to be 0 and the tap coefficient C3 is assumed to be 1. And if the amplitude of X3 is not less than the predetermined threshold value, the tap coefficients that are shown in FIG. 6 may be used.

Moreover, if an edge for which the frequency of the module is more than the predetermined threshold value is detected, the amplitude of the edge that is included in this module can be emphasized. In this case, in the transversal filter in FIG. 5, when the module frequency is less than the threshold value 1 or when the amplitude of X3 is less than the predetermined threshold value 2, the tap coefficients C1, C2, C4, and C5 are assumed to be 0 and the tap coefficient C3 is assumed to be 1. When the frequency of the module is not less than the threshold value 1 and the amplitude of X3 is not less than the threshold value, the tap coefficients that are shown in FIG. 6 may be used. By changing the tap coefficients dynamically, in accordance with the thick black bar and the thick white bar, the emphasizing characteristics that emphasize the amplitude of the edge included in the module can be changed.

Moreover, in this embodiment, a case of using an optical system that irradiates a bar code by a light beam to acquire reflected light is described. However, the present invention is not restricted to this case only and can also be applied similarly for a case of using an optical system in which extraneous light such as a charged coupled device (CCD) is used.

Furthermore, while realizing the bar-code reader by a computer program, each section (processor) in the reading processor 5 illustrated in FIG. 1 may be stored in a read only memory (ROM) as a program and each program may be executed by a central processing unit (CPU).

Thus, the present invention provides a bar-code reader, a method of reading a bar code, and a computer program for realizing the method according to the present invention on a computer that enables efficient and accurate reading of a bar code.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A bar-code reader comprising:
an optical scanner that optically scans a bar code to obtain signal strength of light reflected from black bars and white bars of the bar code;
an extracting unit that extracts edge data, which includes a plurality of edges and the signal strength of which changes corresponding to a change from a black bar to a white bar and vice versa;

an edge-emphasizing unit that emphasizes edge data of an edge that satisfies a predetermined condition;

a ternary judgment unit that makes a ternary judgment of each edge based on the edge emphasized to obtain a ternarizing result; and a decoder that decodes bar-code characters from the ternarizing result, wherein the edge-emphasizing unit emphasizes an amplitude of the edge, when the edge data is expressed in a waveform with time on a horizontal axis and amplitude on a vertical axis, and when an edge having a frequency of a module greater than a predetermined threshold value is detected, and causes a change in emphasizing characteristics that emphasize the amplitude of the edge, based on the frequency of the module.

2. A method of reading a bar code comprising:

optically scanning a bar code to obtain signal strength of light reflected from black and white bars of the bar code;

extracting edge data, which includes a plurality of edges and the signal strength of which changes corresponding to a change from a black bar to a white bar and vice versa;

emphasizing an edge from the edge data;

making a ternary judgment for each edge based on the edge emphasized to obtain a ternarizing result; and decoding bar-code characters from the ternarizing result, wherein the emphasizing includes emphasizing an amplitude of the edge, when the edge data is expressed in a waveform with time on a horizontal axis and amplitude on a vertical axis, and when an edge having a frequency of a module greater than a predetermined threshold value is detected, and causing a change in emphasizing characteristics that emphasize the amplitude of the edge, based on the frequency of the module.

3. A computer program for reading a bar-code that makes the computer execute:

optically scanning a bar code to obtain signal strength of light reflected from black and white bars of the bar code;

extracting edge data, which includes a plurality of edges and the signal strength of which changes corresponding to a change from a black bar to a white bar and vice versa;

emphasizing an edge from the edge data;

making a ternary judgment of each edge based on the edge emphasized to obtain a ternarizing result; and decoding bar-code characters from the ternarizing result, wherein the emphasizing includes emphasizing an amplitude of the edge, when the edge data is expressed in waveform with time on a horizontal axis and amplitude on a vertical axis, and when an edge having a frequency of a module greater than a predetermined threshold value is detected, and causing a change in emphasizing characteristics that emphasize the amplitude of the edge, based on the frequency of the module.

* * * * *